US008685553B2

(12) United States Patent
Rich et al.

(10) Patent No.: US 8,685,553 B2
(45) Date of Patent: Apr. 1, 2014

(54) MOBILE ELECTRONIC DEVICE HAVING A FUEL CELL SURROUNDED BY A SOLID-STATE BATTERY

(75) Inventors: David Gerard Rich, Waterloo (CA); Taha Shabbir Husain Sutarwala, Toronto (CA); Chee-Ming Jimmy Wu, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 546 days.

(21) Appl. No.: 12/961,416

(22) Filed: Dec. 6, 2010

(65) Prior Publication Data

US 2012/0141842 A1 Jun. 7, 2012

(51) Int. Cl.
*H01M 16/00* (2006.01)
*H01M 10/50* (2006.01)
*H01M 8/04* (2006.01)

(52) U.S. Cl.
USPC ............... 429/9; 429/120; 429/433; 429/434

(58) Field of Classification Search
USPC ...................... 429/9, 120, 433, 434
See application file for complete search history.

(56) References Cited

U.S. PATENT DOCUMENTS

| 6,326,097 | B1 | 12/2001 | Hockaday |
| 6,887,596 | B2 | 5/2005 | Leban |
| 7,122,260 | B2 | 10/2006 | Chang et al. |
| 7,122,262 | B2 | 10/2006 | Wang et al. |
| 7,205,057 | B2 | 4/2007 | McLean |
| 7,292,441 | B2 | 11/2007 | Smalc et al. |
| 2002/0162693 | A1 | 11/2002 | Mizuno et al. |
| 2003/0138676 | A1 | 7/2003 | Leban |
| 2003/0232229 | A1 | 12/2003 | Bergovist |
| 2005/0058879 | A1* | 3/2005 | Guay ............... 429/38 |
| 2005/0077865 | A1 | 4/2005 | Durbin et al. |
| 2005/0123818 | A1 | 6/2005 | Ihara |
| 2006/0001398 | A1 | 1/2006 | Nguyen |
| 2008/0079386 | A1* | 4/2008 | Kabumoto et al. ....... 320/101 |
| 2009/0297893 | A1 | 12/2009 | Ito |
| 2011/0268995 | A1* | 11/2011 | Takagi et al. ............ 429/7 |

FOREIGN PATENT DOCUMENTS

| DE | 102007051311 | 10/2007 |
| DE | 102007051311 | 4/2009 |
| EP | 2224530 | 9/2010 |
| WO | 2005120161 | 12/2005 |
| WO | 2007008342 | 1/2007 |
| WO | 2007019106 | 2/2007 |
| WO | 2007055301 | 5/2007 |
| WO | WO 2010001981 A1 * | 1/2010 |

OTHER PUBLICATIONS

European Patent Office: "Communication Extended European Search Report pursuant to Rule 62, EPC", Jan. 31, 2011, European Patent Application Serial No. 10193742.3, 6 pages, Europe.

(Continued)

*Primary Examiner* — Sean P Cullen
(74) *Attorney, Agent, or Firm* — Bereskin & Parr LLP

(57) ABSTRACT

According to one aspect, a mobile electronic device having a fuel cell configured to receive fuel and generate therefrom electrical power for the mobile electronic device, a fuel tank adapted to store fuel and provide fuel to the fuel cell, and a solid-state battery configured to provide power to the mobile device. The solid-state battery is sized and shaped to at least partially surround at least one of the fuel cell and the fuel tank.

16 Claims, 11 Drawing Sheets

(56) References Cited

OTHER PUBLICATIONS

Canadian Intellectual Property Office. Examiner's Report. Nov. 22, 2012, Canadian Patent Application Serial No. 2,760,374, 3 pages, Canada.

Haylery A. Every, Andrea G. Bishop, Douglas R. MacFarlane, Greger Oradd and Maria Forsyth, "Room temperature fast-ion conduction in imidazolium halide salts." Journal of Chemistry Materials, Nov. 7, 2001.

EnFilm : Solid State Rechargeable Energy Film, undated.

Extended European Search Report, European Patent Office, Jan. 2, 2011 for European Patent Applicataion Serial No. 10193835.5.

http://www.horizonfuelcell.com/electronics.htm, accessed Aug. 20, 2013.

http://www.hitechreview.com/it-products/toshiba-launches-dynario-direct-methanol-fuelcell-external-power-source-for-mobile-electronic-devices/18692/, published Oct. 22, 2009.

Office Action from U.S. Appl. No. 12/959,466, mailed Mar. 28, 2013.

* cited by examiner

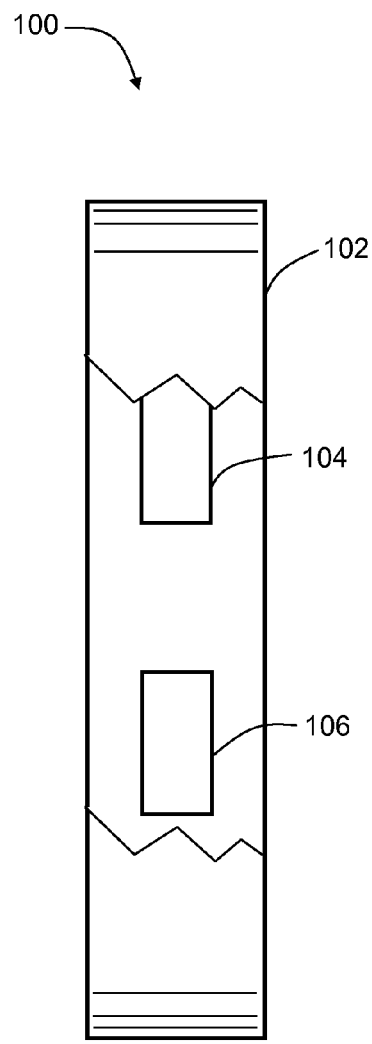
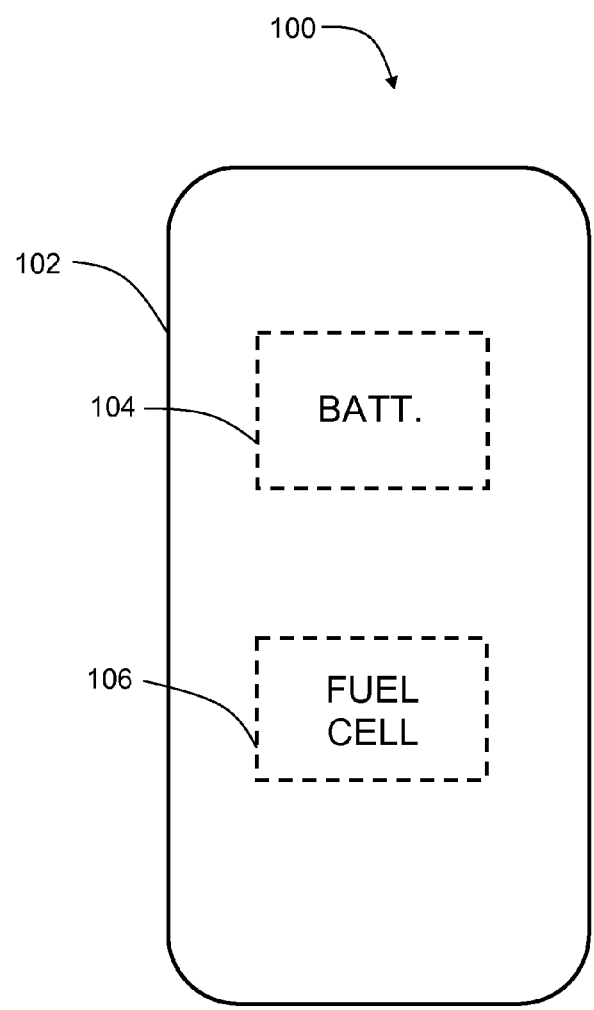
FIG. 12  FIG. 13

MOBILE ELECTRONIC DEVICE HAVING A FUEL CELL SURROUNDED BY A SOLID-STATE BATTERY

FIELD

Embodiments herein relate generally to the field of mobile electronic devices, and more specifically to mobile electronic devices having fuel cells with solid-state batteries that at least partially surround the fuel cell.

INTRODUCTION

Fuel cells have become increasing popular in recent years due to their potential use in electricity generation and relatively low environmental impact.

Generally, a fuel cell is an electro-chemical conversion device that produces electricity from a reaction between a fuel and an oxidant in the presence of an electrolyte located therebetween. In operation, the fuel and the oxidant flow into the fuel cell, producing electricity and a residue or waste product. For example, in the case of a hydrogen fuel cell, hydrogen is the fuel, oxygen or air may be used as the oxidant, and the fuel cell produces electricity along with water residue (in a liquid or gaseous state). Unlike batteries that store chemical energy in a closed system, fuel cells consume reactants that require replenishment to maintain the reaction. Therefore, a fuel cell is normally accompanied by a fuel tank that stores fuel.

BRIEF DESCRIPTION OF THE DRAWINGS

FIG. 12 is a schematic side view of a mobile electronic device having a frame that serves as a fuel tank that surrounds at least one energy storage device;

FIG. 13 is a schematic front view of the mobile electronic device of FIG. 12;

DETAILED DESCRIPTION

Figure 1:
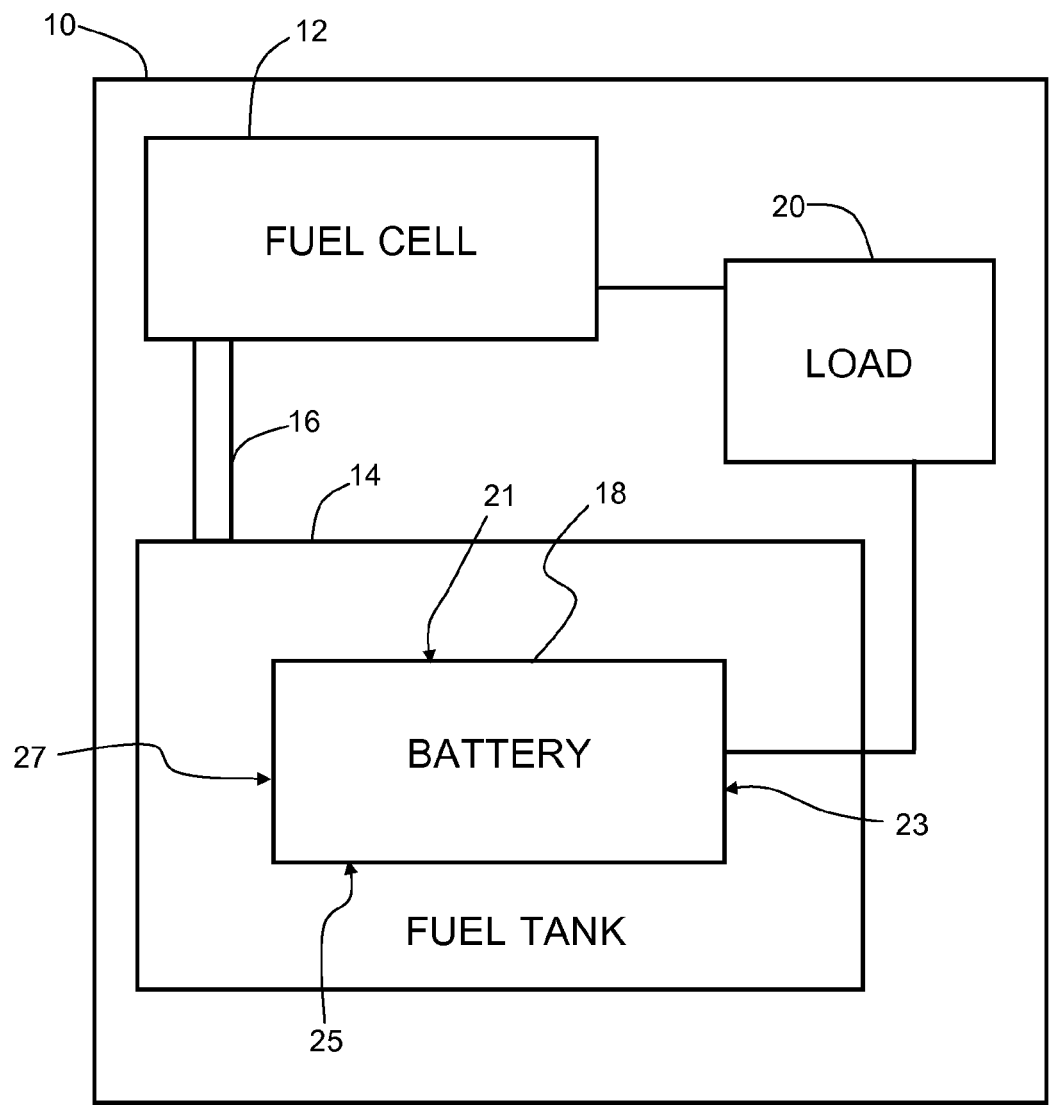
FIG. 1 is a schematic view of a mobile electronic device with a fuel cell having a fuel tank that surrounds a battery according to one embodiment.

Recently, efforts have been made to incorporate fuel cells into portable electronic devices (also herein called mobile electronic devices). Efforts have been extended to handheld portable electronic devices, i.e., devices sized to be carried or held in a human hand (e.g. smart phones, readers, tablet computers, etc.). Some portable electronic devices that include fuel cells may also include one or more supplemental energy storage devices (e.g. a battery or capacitor) to better meet the varying power demands of the portable electronic device.

Some energy storage devices, such as batteries, can experience significant temperature increases while powering a portable electronic device. Temperature increases may be undesirable, as they may tend to reduce battery life, decrease efficiency, or interfere with the operation of the portable electronic device. In extreme cases, high heat may result in safety concerns, and may risk damage to the mobile electronic device or make operation of the mobile electronic device uncomfortable for the user. The following disclosure discusses devices and techniques whereby the heat can be managed and in some cases even put to good use.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein.

Some of the embodiments described herein refer to a mobile electronic device. Generally, a mobile electronic device may be a two-way communication device with data communication capabilities, and which may include the capability to communicate in a wireless or wired fashion with other devices, including other mobile electronic devices. The mobile electronic device may include the capability for voice communications. The mobile electronic device may include the capability for data communications.

Depending on the functionality provided by the mobile electronic device, it might also be referred to, for example, as a data-messaging device, a cellular telephone with data messaging capabilities, a wireless Internet appliance, or a data communication device (with or without telephony capabilities). Some examples of mobile electronic devices could include cellular phones, cellular smart-phones, wireless organizers, personal digital assistants, handheld wireless communication devices, wirelessly enabled notebook computers, tablet computers and the like.

The embodiments herein generally relate to mobile electronic devices that include fuel cells. More particularly, some of the embodiments herein relate to mobile electronic devices with fuel cells, wherein an energy storage device, such as a solid-state battery, at least partially surrounds or encapsulates one or more of the fuel cell and a fuel tank for use with the fuel cell. In other embodiments, one or more of a fuel tank and a fuel cell at least partially surround or encapsulate an energy storage device, such as a solid-state battery.

Generally as used herein, the term "solid-state battery" refers to a battery that has both solid electrodes and solid electrolytes. Examples of solid-state battery materials may include, for example, $Ag_4RbI_5$ for $Ag^+$ conduction, $LiI/Al_2O_3$ mixtures for $Li^+$ conduction, and the clay and n-alumina group of compounds ($NaAl_{11}O_{17}$) for $Na^+$ and other mono- and divalent ions.

As briefly discussed above, during use a mobile electronic device may experience varying levels of power consumption. For example, when a mobile electronic device is in an idle or "sleep" state, various components on the mobile electronic device may be deactivated (e.g. the display screen and radio may be powered off) and the mobile electronic device may consume low amounts of power. Alternatively, when a mobile electronic device is in an active state (e.g. when a user is making a telephone call, or sending and receiving data messages), the mobile electronic device may consume large quantities of power.

Accordingly, some mobile electronic devices with a fuel cell may also include a supplemental energy storage device (e.g. a battery, which could be a solid-state battery, a capacitor, a supercapacitor, etc.) to help accommodate the power requirements of the mobile electronic device. For example, in some embodiments the size of the fuel cell and fuel tank may be selected to accommodate most of the power needs of the mobile electronic device, while another energy storage device (e.g. a solid state battery) may be selected to provide additional power during periods of high power consumption that exceed the output capacity of the fuel cell.

The energy storage device may be useful in providing power to the mobile electronic device during a start-up condition. For example, when a device is initially powered on, the fuel cell may not be immediately ready to provide desired levels of power. Thus the energy storage device can provide power during startup until the fuel cell becomes fully operational and produces the necessary power.

One challenge faced by batteries and other energy storage devices on mobile electronic devices is that they tend to heat up when in use. This can be particularly problematic on high bandwidth devices, such as 3G+LTE devices. For example, when a battery is being used to power a mobile electronic device during peak power consumption (e.g. during a telephone call in a low signal strength condition), the temperature of the battery can increase dramatically. For example, during peak power consumption the temperature in the battery can increase from room temperature to 45 degrees or more within ten minutes.

In some cases, at least some of this heat increase may be due to heat emanated from other components in the mobile electronic device, and not due to discharge from the battery.

This increase in temperature is generally undesirable, and it can reduce the life cycle of the battery, decrease battery efficiency, as well as cause safety concerns.

Some mobile electronic devices can be configured to temporarily deactivate power flow to and from a battery when the battery temperature exceeds a particular temperature threshold. For example, some mobile electronic devices are configured to charge a battery at a base rate when the battery temperature is less than a first temperature, charge at a reduced rate when the battery temperature is between the first temperature and a second temperature, and cease charging completely when the battery temperature exceeds the second temperature.

This "charging cut-off" can be undesirable, as it can increase charging time. It may also limit the functionality of the mobile electronic device if sufficient power from the battery or the charging circuit (or both) is not available to power all of the desired tasks.

Accordingly, some of the embodiments as described herein can be used to reduce the temperature of the battery or other energy storage device to desired levels during use. This can be useful to inhibit or reduce the effects of increasing temperature on decreasing battery power output, reduce or inhibit the occurrence of battery deactivation, and can lead to longer battery life.

Generally, in some embodiments this can be accomplished by providing the fuel tank of the fuel cell and the battery or other energy storage device in a configuration where heat transfer between the battery and the fuel tank is facilitated. By providing good heat transfer between the battery and the fuel in the fuel tank, a heat sink for the battery is provided that can draw excess heat energy away from the battery.

As will be described below, other embodiments as described herein may be used to increase the temperature of an energy storage device, such as a solid-state battery. This may be beneficial under certain operating conditions, particularly with solid-state batteries as increase the temperature may improve the ionic conductivity of the solid-state battery and thus may improve the overall power performance. Similar techniques may be used to facilitate increasing the temperature of the battery, for example by generally providing for good heat transfer from at least one of the fuel cell and fuel tank to a solid-state battery, for example.

In some embodiments, the fuel tank can be sized and shaped to at least partially surround an energy storage device (e.g. the battery). For example, the fuel tank might surround at least three outer surfaces of the battery. In another example, the fuel tank might surround at least 50% of the exterior surface area of the battery. In yet another example, the fuel tank might surround at least 75% of the exterior surface area of the battery. In yet another example, the fuel tank might surround at least 90% of the exterior surface area of the battery.

It will be understood that, as used herein, the term "surround" need not require that the fuel tank and battery are in direct thermal contact (although this is one option). In particular, in some embodiments there may be a small air gap between the fuel tank and the battery, or there may be another body (e.g. a layer of material) disposed between the fuel tank and the battery, even though the fuel tank surrounds the battery.

By surrounding the battery with the fuel tank, heat transfer (e.g. via at least one of conduction, convection and radiation) between the fuel tank and the battery tends to be encouraged. For example, thermal radiation emitted by the battery will tend to be absorbed by the fuel tank, and vice versa.

In other embodiments, heat transfer between the battery and the fuel tank may be further facilitated by providing the battery and the fuel tank in thermal contact (e.g. with no gap therebetween). For example, in some embodiments, at least 50% of the exterior surface area of the battery may be in thermal contact with the fuel tank. In other examples, at least 75% of the exterior surface area of the battery may be in thermal contact with the fuel tank. In yet another example, at least 90% of the exterior surface area of the battery may be in thermal contact with the fuel tank. In some embodiments, three or more exterior surfaces of the battery may be in thermal contact with the fuel tank.

Generally, the thermal contact can be "direct" or "indirect".

For example, the battery and fuel tank may be at least partially in direct thermal contact (e.g. the battery and fuel tank may be in direct contact so that heat energy can flow directly therebetween). In some embodiments, the battery and fuel tank may be at least partially in indirect thermal contact (e.g. the battery and fuel tank may be separated by another element that facilitates heat transfer therebetween, for example a heat conductive material such as a gel, a conductive metal plate, etc.).

By providing the battery and fuel tank in thermal contact, heat transfer between the battery and the fuel tank can be encouraged through "heat conduction".

In some embodiments, the fuel tank may be sized and shaped so as to at least partially surround the battery and also be in thermal contact with the battery. This configuration tends to encourage heat transfer between the battery and the fuel tank using various heat transfer modes (e.g. conduction and radiation, and in some cases convection, for example where there may be an air gap between the fuel tank and the battery).

In some embodiments, by providing good heat transfer between the battery and the fuel tank, undesirable heat can be drawn away from the battery and into the fuel tank, cooling the battery and which may tend to reduce the thermal gradient across the battery. In other embodiments, heat transfer may be used to increase the battery temperature (as will be described further below). Controlling battery temperature may result in a number of benefits, such as increasing battery efficiency, lengthening battery life and reducing heat-related swelling of the battery.

In some embodiments, as heat energy is drawn from the battery into the fuel tank, it will tend to heat the fuel therein. Accordingly, in some embodiments the selection of the particular fuel in the fuel tank will be coordinated with the design and implementation of the fuel cell and the battery on the mobile electronic device to provide for desired operating characteristics.

In some embodiments, the fuel may be selected to have a high heat capacity. Accordingly, the fuel in the fuel tank may be able to absorb large quantities of heat energy from the battery while experiencing a relatively mild increase in temperature. For example, in some embodiments, the fuel may be a metal hydride fuel (e.g. $Ca_{0.2}Mm_{0.8}Ni_5$) having a heat capacity greater than 820 MJ/m$^3$.

In some embodiments, a fuel can be selected that is endothermically released. Thus, as heat energy is drawn from the battery and heats the fuel in the fuel tank, this may tend to increase the reaction rate of the fuel and increase the overall performance of the fuel cell.

In some embodiments, a fuel can be selected that has both a high heat capacity and which is endothermically released.

In some embodiments, the change in reaction rate versus temperature can be controlled using one or more techniques, such as by combining multiple metal hydride fuels in the fuel tank, each metal hydride having specific temperature characteristics or partial-pressure characteristics (or both).

Examples of suitable fuels could include endothermic metal hydrides, and liquid fuels with a high heat capacity (such as butane, ethanol, methanol, etc). In some embodiments, the mobile energy storage device and fuel tank can be configured to ensure that the temperature in the fuel tank is maintained at less than the flash point of the fuels so as to inhibit an explosion or fire during use. This may include adding various safety shut-off systems that monitor temperature and deactivate certain elements accordingly.

Generally, the selection of the fuel and the configuration of the fuel cell are complementary, and can be based according to the desired operating characteristics of the mobile electronic device.

In some cases, heat from the battery can be used to throttle the operation of the fuel cell due to the relationship between the heat energy from the battery and the release of endothermic fuel.

In some embodiments, when both the fuel cell and the battery are operating at high temperatures, large quantities of fuel will tend to be consumed by the fuel cell, and thus heat energy can be drawn from the battery to the fuel tank at a relatively high rate. Conversely, when both the battery and fuel cell are operating at low temperatures, generally less fuel will be consumed by the fuel cell (and thus the rate of heat transfer from the battery may be lower).

In some examples, the embodiments herein can be integrated with the design of the fuel cells and mobile electronic devices (e.g. the battery and fuel tank may be "built-in" to the design of the mobile electronic device). In other examples, the embodiments herein may be useful as accessories that can be retrofitted onto existing mobile electronic devices.

Turning now to FIG. 1, illustrated therein is a schematic illustration of a mobile electronic device 10 according to one embodiment. As shown, the mobile electronic device 10 includes a fuel cell 12 used to provide at least some of the power to the mobile electronic device 10. Coupled to the fuel cell 12 is a fuel tank 14 for storing fuel used by the fuel cell 12. As shown, the fuel tank 14 may be coupled to the fuel cell 12 using one or more conduits 16. In other embodiments, the fuel cell 12 and fuel tank 14 may be directly coupled.

The mobile electronic device 10 may also include one or more reagent (or residue) storage tanks (not shown) for storing the waste products generated by the fuel cell 12.

In this example, the mobile electronic device 10 also includes an energy storage device in the form of a battery 18. The battery 18 is configured to also provide power to the mobile electronic device 10 depending on the operating characteristics of the mobile electronic device 10 (e.g. during startup, peak power consumption, or at various other times).

Generally, the battery 18 could be any suitable battery for use with a mobile electronic device, and which may benefit from temperature control (either increasing the battery temperature or lowering the battery temperature), for example to improve performance, increase safety, and so on. Some examples could include a lithium-ion battery, a metal hydride battery, a polymer battery, a silver zinc battery, a zinc-air battery, a solid-state battery, and so on.

As shown, the fuel cell 12 and battery 18 may be electrically connected to one or more loads (illustrated generally as load 20). The load 20 can represent various components of the mobile electronic device 10, such as a display screen, power amplifiers (e.g. for radio transmission), audio output devices, processors, etc. In some cases, the load 20 may include a battery charger for charging the battery 18 (for example, the fuel cell 12 could power a battery charger for recharging the battery 18).

As generally discussed above, when the battery 18 is used to power loads 20 on the mobile electronic device 10, the temperature of the battery 18 tends to increase. Accordingly, in this embodiment the fuel tank 14 may be sized and shaped so as to act as a heat sink for the battery 18.

In particular, as shown in FIG. 1, the battery 18 is at least partially surrounded or enclosed by the fuel tank 14. In this schematic, all four outer surfaces 21, 23, 25 and 27 of the battery 18 are surrounded by the fuel tank 14 (e.g. at least 90% of the battery 18 is surrounded by the fuel tank 14). Thus, heat radiating from the battery 18 will tend to be absorbed by the fuel tank 14.

In other embodiments, the fuel tank 14 may surround less of the surface area of the battery 18. For example, the fuel tank 14 might surround at least 50% of the exterior surface area of the battery 18. In yet another example, the fuel tank 14 might surround at least 75% of the exterior surface area of the battery 18.

Furthermore, in this embodiment the battery 18 and fuel tank 14 are in direct thermal contact on all exterior surfaces 21, 23, 25 and 27 of the battery 18 (e.g. at least 90% of the exterior surface area of the battery 18 is in direct thermal contact with the fuel tank 14). Accordingly, heat energy from the battery 18 can be conducted away from the battery 18 and into the fuel tank 14 (and thus into the fuel in the fuel tank 14).

In other embodiments, the fuel tank 14 may be in thermal contact with less of the surface area of the battery 18. For example, at least 50% of the exterior surface area of the battery 18 may be in thermal contact with the fuel tank 14. In another example, at least 75% of the exterior surface area of the battery 18 may be in thermal contact with the fuel tank 14.

In other embodiments, the fuel tank 14 and battery 18 may be at least partially in indirect thermal contact.

In some embodiments the fuel in the fuel tank 14 may be a fuel that is endothermically released. Thus, as heat energy is drawn from the battery 18 and heats the fuel in the fuel tank 14, the rate of reaction of the fuel can actually increase and tending to result in higher output from the fuel cell 12.

In some embodiments, (e.g. if the fuel is butane or methanol), pre-warming the fuel may also lead to better efficiency for the fuel cell 12 and higher power output.

In some embodiments, the fuel tank 14 may be made of suitable materials configured to withstand the temperatures experienced due to heat transfer between the battery 18 and the fuel tank 14. For example, the fuel tank 14 may be made of metals, high-temperature plastics, composite materials, etc.

Figure 3:
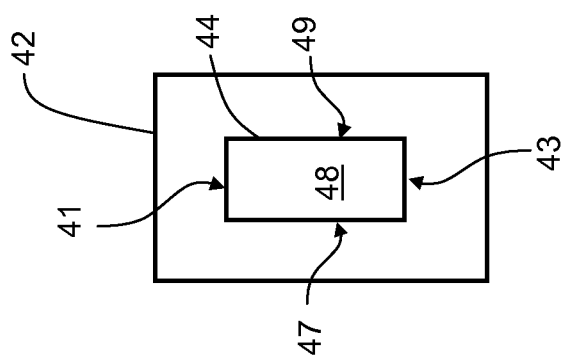
FIG. 3 is a schematic end view of the fuel tank and energy storage device of FIG. 2.
Figure 2:
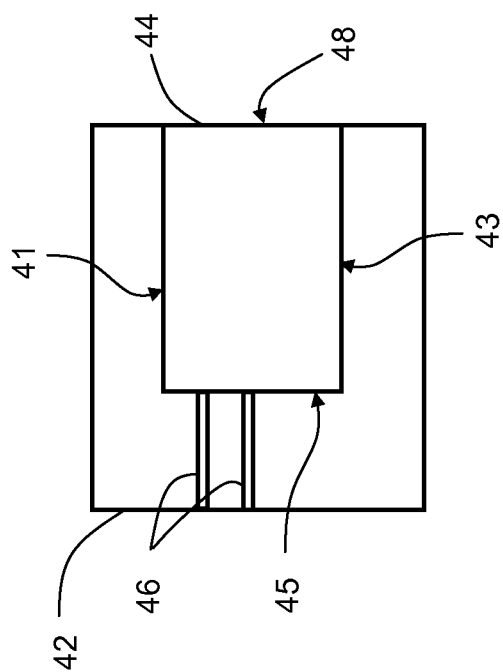
FIG. 2 is a schematic side-view of a fuel tank surrounding an energy storage device according to another embodiment.

Turning now to FIGS. 2 and 3, illustrated therein are side and end views, respectively, of a fuel tank 42 and energy storage device according to another embodiment. In this example, the energy storage device 44 (e.g. a battery, capacitor, etc.) is shaped as a rectangular prism with six surfaces 41, 43, 45, 47, 48 and 49 and rectangular cross sections.

As shown, when coupled the fuel tank 42 surrounds five of the six surfaces (e.g. 41, 43, 45, 47 and 49) of the energy storage device 44. However, the sixth surface 48 is exposed and is not surrounded by the fuel tank 42. Furthermore, five surfaces (e.g. 41, 43, 45, 47 and 49) of the energy storage device 44 are in direct thermal contact with the fuel tank 42.

In this embodiment, the energy storage device 44 may be electrically connected (e.g. via surface 45) to feed through contacts 46 that pass through the fuel tank 42. The contacts 46 can be used for electrically coupling the energy storage device 44 to one or more loads on a mobile electronic device. This arrangement may be useful, for example, to allow the energy storage device 44 to be inserted into the fuel tank 42 without removing or replacing any battery covers on the mobile electronic device.

In other embodiments, the exposed surface 48 of the energy storage device 44 may be electrically coupled to a load after the energy storage device 44 has been received within the fuel tank 42, such as by placing an electrically conducting cover over the exposed surface 48.

Figure 4:
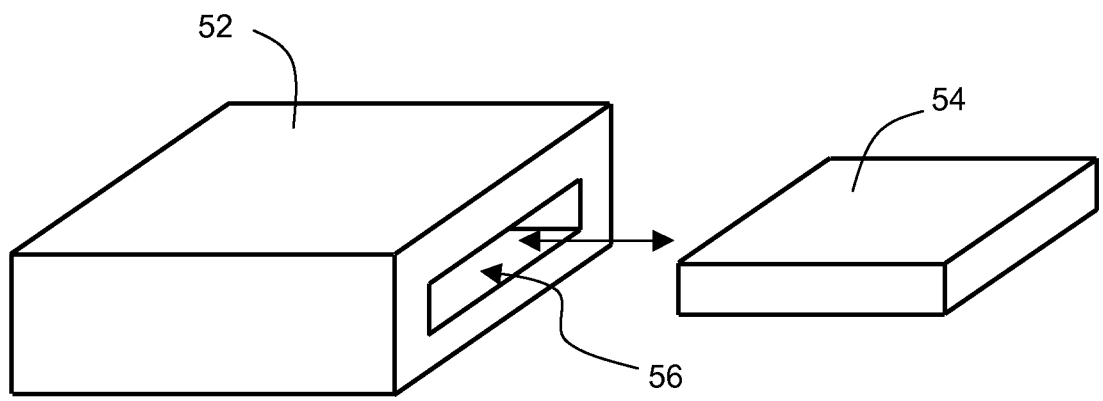
FIG. 4 is a perspective view of a fuel tank for surrounding an energy storage device according to another embodiment with the fuel tank and energy storage device decoupled.
Figure 5:
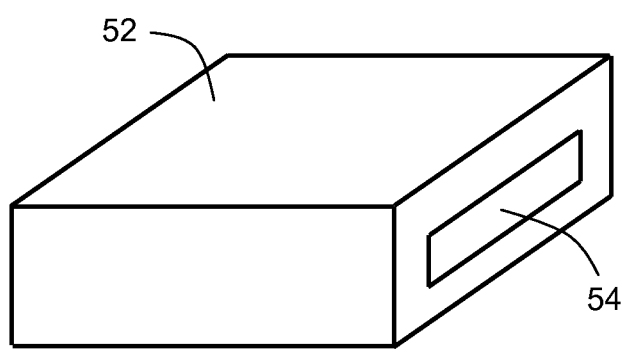
FIG. 5 is a perspective view of the fuel tank and energy storage device of FIG. 4 with the energy storage device received within the fuel tank.

Turning now to FIGS. 4 and 5, as shown an energy storage device 54 may be configured to be removably inserted into an opening 56 of a fuel tank 52 on a mobile electronic device. In this manner, the battery or energy storage device 54 can be separately removed from the mobile electronic device without removing the fuel tank 52.

In some embodiments, the mobile electronic device could be configured to provide "hot-swapping" of the energy storage device 54 (e.g. a battery) without the need to turn off the mobile electronic device or remove the fuel tank 52 from the mobile electronic device. For example, when the mobile electronic device is powered on and operating in a mode where the desired power can be provided by the fuel cell (i.e. such that the battery need not be supplying power to the mobile electronic device), the battery or energy storage device 54 could be removed and replaced with a different battery or other energy storage device.

In some embodiments, hot-swapping of batteries may be possible while the mobile electronic device is operating in a high power mode (e.g. that exceeds the capacity of the fuel cell) if a second energy storage device is also provided to supply power to the mobile electronic device. For example, if the mobile electronic device also includes a capacitor or a "super-capacitor" that can provide power thereto, the battery or other energy storage device 54 may be removed during a high power condition.

Figure 6:
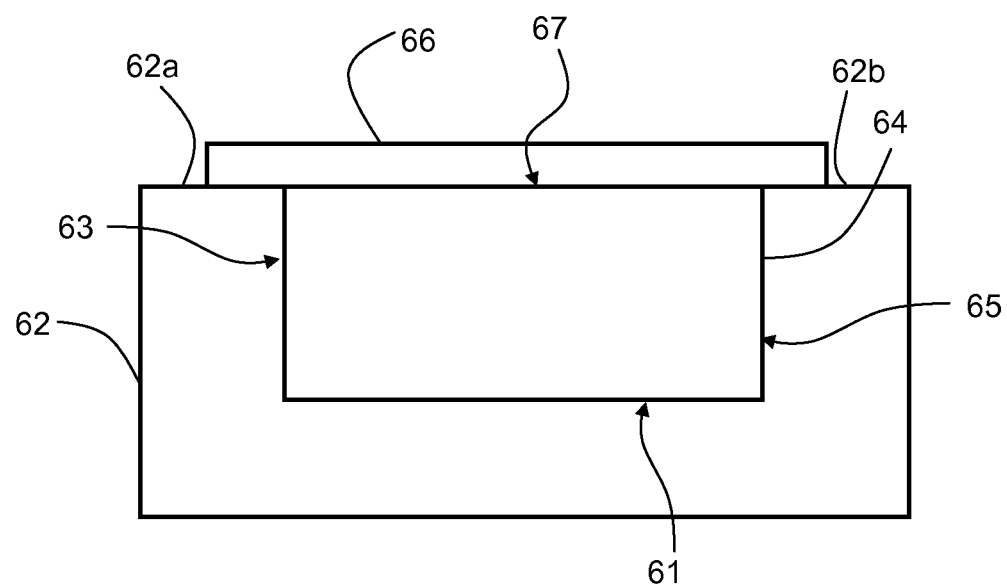
FIG. 6 is a schematic view of a fuel tank surrounding an energy storage device and including a cover according to another embodiment.

Turning now to FIG. 6, in this embodiment a fuel tank 62 of a fuel cell is configured to surround an energy storage device 64. As shown in this schematic, the fuel tank 62 surrounds and is in thermal contact with at least three surfaces 61, 63 and 65 of the energy storage device 64. Depending on the size of each surface, this may amount to various proportions of the exterior surface. For example, in some embodiments this may be at least 50% of the exterior surface area of the energy storage device 64, at least 75% of the exterior surface area of the energy storage device 64, more than 75%, or less than 50%.

This embodiment also includes a cover 66. The cover 66 may help to secure the energy storage device 64 to the fuel tank 62 to inhibit disengagement thereof.

For example, in some embodiments, the energy storage device 64 may be secured to or a part of the cover 66 so that the energy storage device 64 may be inserted and removed from the fuel tank 62 by inserting and removing the cover 66, respectively.

In other embodiments, the cover 66 and energy storage device 64 may be separate components.

In some embodiments, the cover 66 may be thermally insulating and may inhibit heat on a rear surface 67 of the energy storage device 64 from being drawn away from the energy storage device 64.

In other embodiments, the cover 66 may be thermally conducting so that heat from the energy storage device 64 emitted by the rear surface 67 may tend to be transmitted through the cover 66 by conduction (e.g. to the ends 62a, 62b of the fuel tank 62).

In some embodiments, the cover 66 may include one or more electrical connectors for electrically coupling the energy storage device 64 to one or more components of the mobile electronic device 10.

Figure 7:
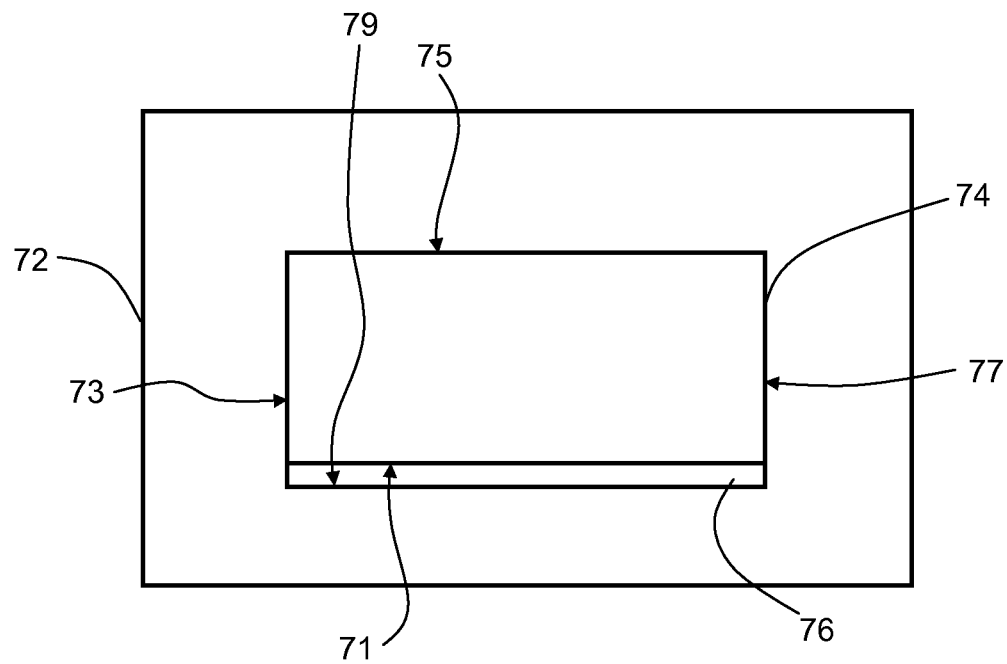
FIG. 7 is a schematic view of a fuel tank surrounding an energy storage device incorporating a thermal element according to yet another embodiment.

Turning now to FIG. 7, in this embodiment a fuel tank 72 surrounds all four sides (71, 73, 75, and 77) of an energy storage device 74, with direct thermal contact with three of the surfaces of the energy storage device 74 (e.g. surfaces 73, 75, 77). In this embodiment, a thermal element 76 is also provided within the fuel tank 72 adjacent the energy storage device 74. In particular, the thermal element 76 is between the first exterior surface 71 of the energy storage device 74 and an opposing inner surface 79 of the fuel tank 72.

In some embodiments, the thermal element 76 may be used to selectively heat or cool (or both) the energy storage device 74 or the fuel tank 72 or both. For example, the thermal element 76 may be used to heat the fuel in the fuel tank 72. This may be beneficial during a startup condition, as it can assist the fuel in the fuel tank 72 in reaching a desired operating temperature (e.g. where the fuel is endothermically activated or where pre-warming of the fuel may provide performance advantages).

In other embodiments, the thermal element 76 may be used to selectively cool the energy storage device 74 or the fuel tank 72 or both. For example, the thermal element 76 could be used to cool the energy storage device 74 during use, or to further inhibit the temperature of the energy storage device 74 from exceeding a threshold value (e.g. 45 degrees Celsius) thus inhibiting a shut-off condition.

Figure 8:
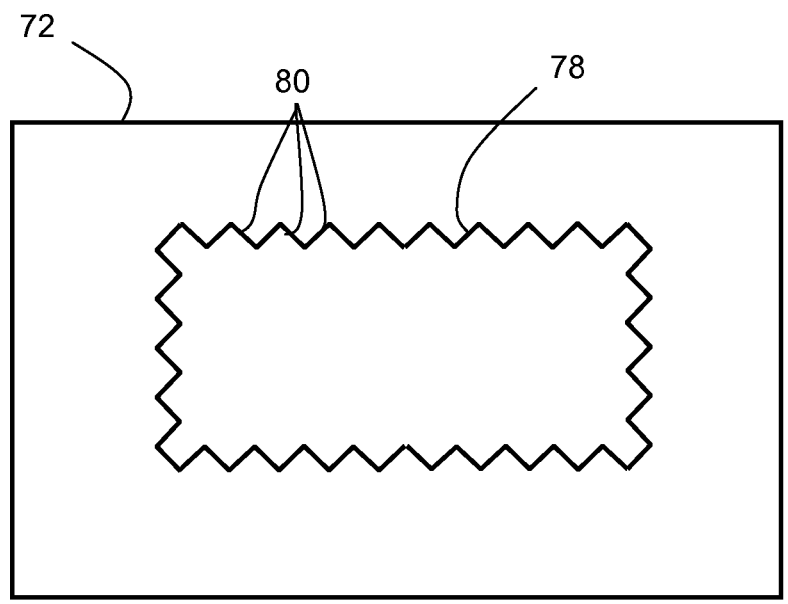
FIG. 8 is a schematic view of a fuel tank surrounding an energy storage device according to yet another embodiment wherein the interface between the energy storage device and the fuel tank is sized and shaped to increase the effective surface area therebetween.

In some embodiments the surface interfaces between the energy storage element and the fuel tank can be enhanced to facilitate heat transfer therebetween. As shown in FIG. 8, for example, the outer surfaces of an energy storage device 78 may have a plurality of ridges 80, with complementary features being provided on the inner surfaces of the fuel tank 72. These ridges may increase the effective surface area between the fuel tank 72 and the energy storage device 74, and can therefore increase the rate of conductive heat transfer therebetween.

It will be appreciated that other surface features could be used to achieve a heat-transfer enhancing effect (e.g. the surfaces could have other patterns or features, such as waves, roughened textures, etc.). In yet other embodiments, surface coatings, conducting gels, inserts, etc. could be provided between the energy storage device and the fuel tank to facilitate the rate of heat transfer therebetween.

Figure 9:
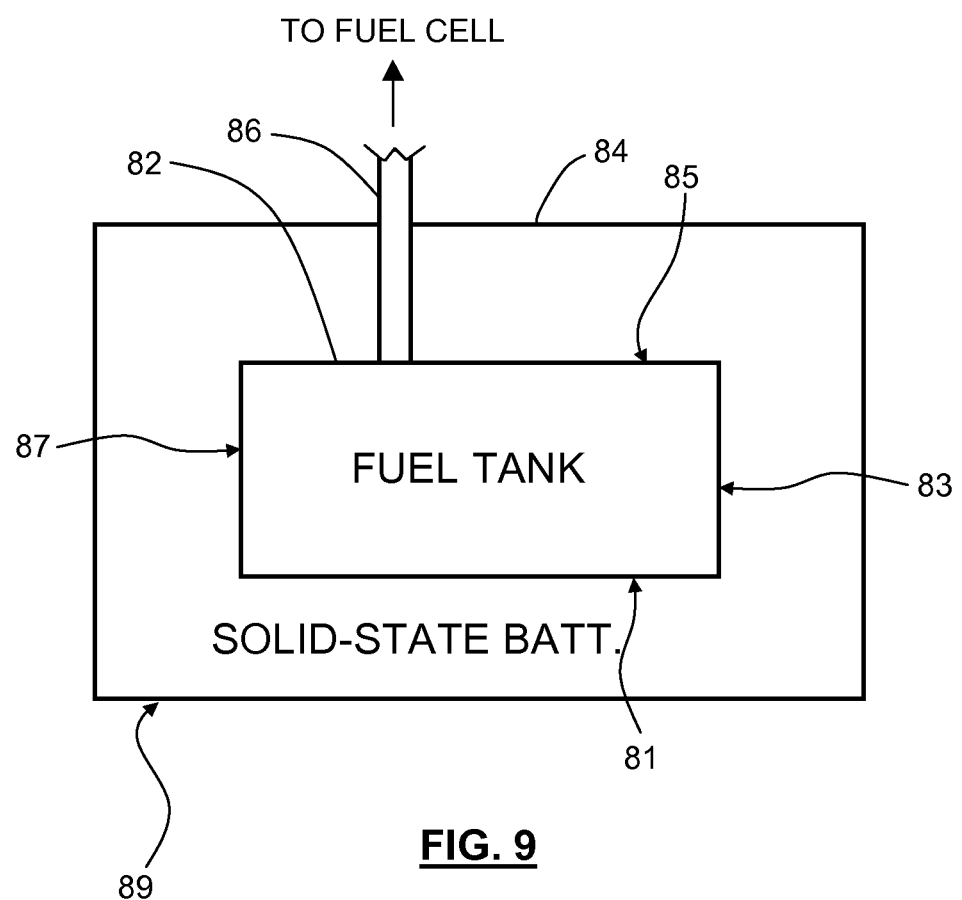
FIG. 9 is a schematic view of an energy storage device, such as a solid-state battery, surrounding a fuel tank according to some embodiments.

Turning now to FIG. 9, in some embodiment, it may be desirable that the arrangement of the fuel tank and battery are reversed. For example, in this embodiment the energy storage device 84 (e.g. a battery or capacitor) is sized and shaped to at least partially surround the fuel tank 82, and which may be in thermal contact therewith. For example, as shown in this schematic the fuel tank 72 is surrounded on, and in thermal contact with, at least four outer surfaces thereof (e.g. surfaces 81, 83, 85, and 87). In this embodiment, a conduit 86 may be provided for transporting fuel in the fuel tank 82 to a fuel cell (not shown in this figure). In some embodiments, the conduit 86 may also be used to replenish the fuel in the fuel tank 82, or a different conduit may be provided for replenishing the fuel tank 82.

The arrangement shown in FIG. 9 may be beneficial depending on the particular configuration of the fuel cell and mobile electronic device. For example, it may be desirable that not all of the heat energy from the energy storage device 84 be directed into the fuel tank 82. Accordingly, in some embodiments one or more outer surfaces (e.g. surface 89) of the energy storage device 84 could be allowed to radiate outwardly, be placed in contact with another heat sink, etc.

Figure 10:
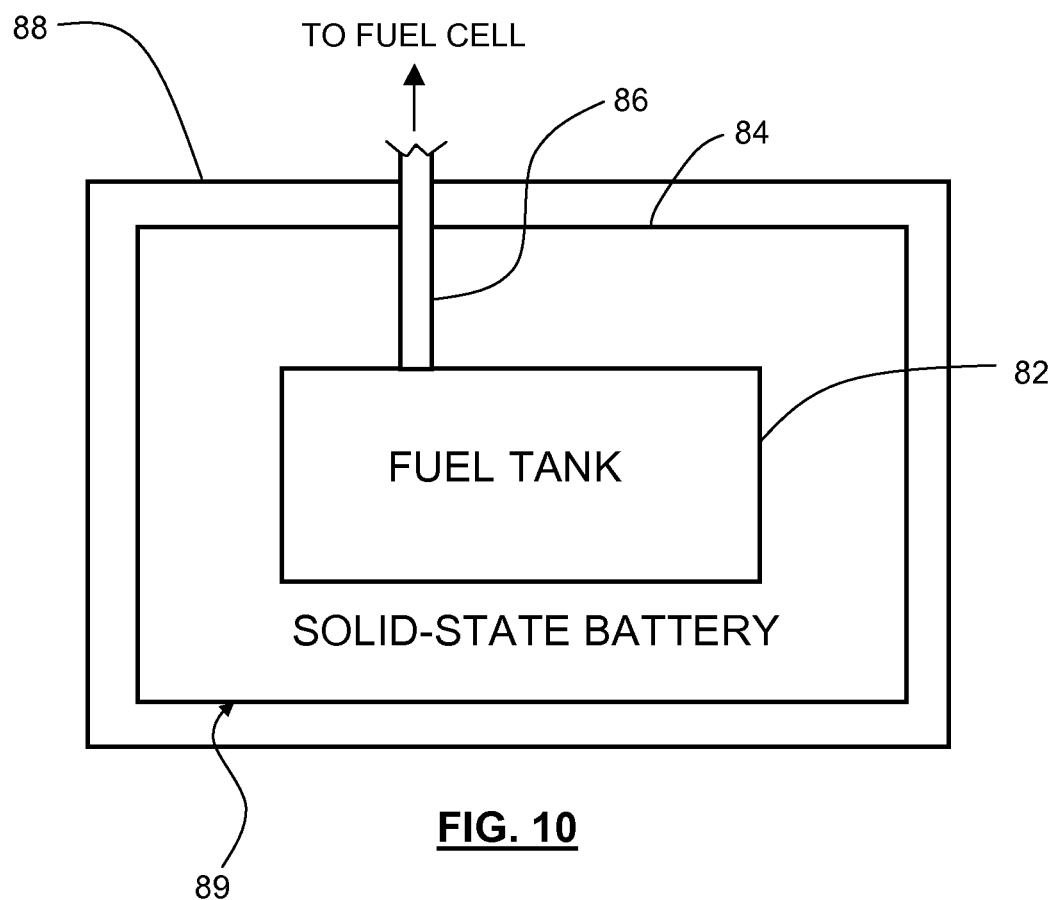
FIG. 10 is a schematic view of an energy storage device, such as a solid-state battery, surrounding a fuel tank and having a thermal insulating element according to another alternative embodiment.

Turning now to FIG. 10, in other embodiments the energy storage device 84 may be at least partially surrounded by a thermal insulating element 88. For example, the thermal insulating element 88 may be provided to inhibit heat from leaving the energy storage device 84 (e.g. via an exterior surface 89). This may be beneficial when it is desirable to raise the temperature of the energy storage device 84 (e.g. when the energy storage device is a solid state battery that has increased efficiencies at some elevated temperatures, or when a thermally-closed battery-fuel tank system is desirable).

This configuration may also be beneficial to insulate the fuel tank 82 and energy storage device 84 when they are operating at very high temperatures. For example, the energy storage device 84 could be a solid-state battery, and the fuel tank 82 could contain a fuel configured to operate at several hundred degrees Celsius. Accordingly, the thermal insulating element 88 may serve to protect other components in the mobile electronic device or the user (or both) from the high temperatures in the fuel tank 82 and energy storage device 84.

In some embodiments, a mobile device may include a fuel tank that is sized and shaped to surround or be in thermal contact with (or both) at least a portion of an energy storage device (e.g. a battery) as well as a fuel cell.

Figure 11:
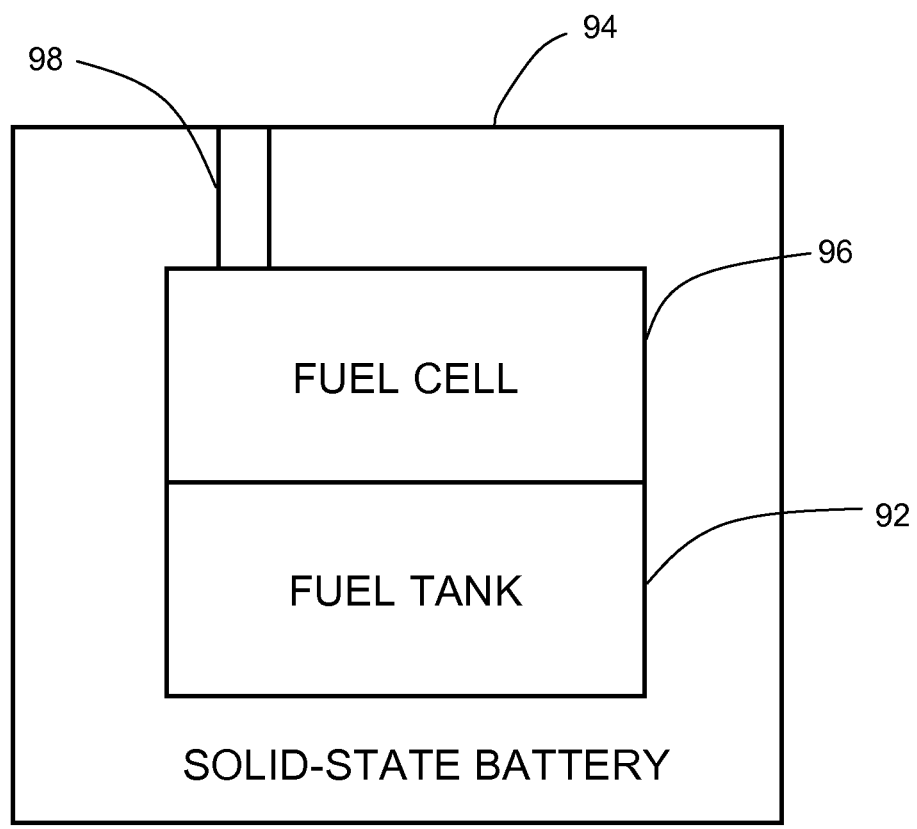
FIG. 11 is a schematic view of an energy storage device, such as a solid-state battery, surrounding a fuel tank and a fuel cell according to yet another embodiment.

Turning now to FIG. 11, in some embodiments, an energy storage device 94 may be configured to at least partially surround or be in thermal contact with (or both) a fuel tank 92 and a fuel cell 96. In such embodiments, one or more conduits 98 may be provided to remove waste products from the fuel cell 96 or to add oxidant to the fuel cell 96 or both.

Turning now to FIGS. 12 and 13, illustrated therein is a mobile electronic device 100 according to another embodiment. In this example, the mobile electronic device includes a frame 102 that functions as a fuel tank. For example, the frame 102 may have one or more hollow portions that are sized and shaped to receive fuel to be used by a fuel cell.

In this embodiment, one or more batteries 104, capacitors or other energy storage devices can be at least partially surrounded by and in direct thermal contact with the frame 102. In some embodiments, the frame 102 may also include the fuel cell 106 therein.

Figure 14:
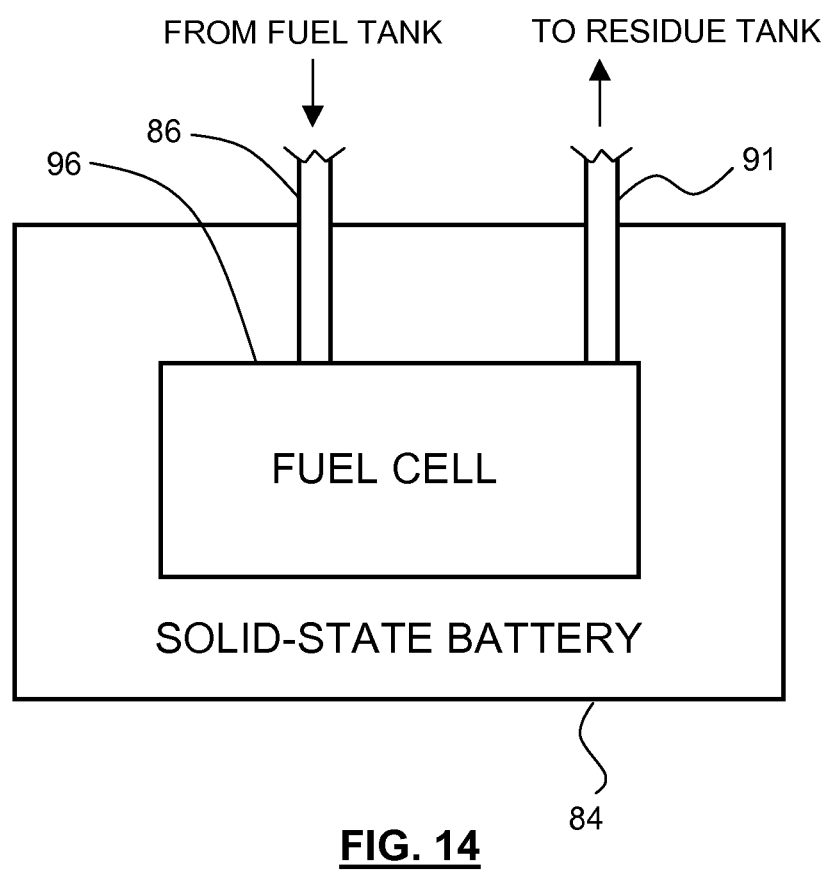
FIG. 14 is a schematic view of an energy storage device, such as a solid-state battery, surrounding a fuel cell according to some embodiments.

Turning now to FIG. 14, illustrated therein is an energy storage device 84, such as a solid-state battery, surrounding a fuel cell 96 according to some embodiments. In this embodiment, a conduit 86 is used to provide fuel from a fuel tank to the fuel cell 96, and residue conduit 91 is used to drain residue generated by the fuel cell 96 to a residue tank (not shown).

In this embodiment, heat from the fuel cell 96 may be used to increase the heat of the 84, which may improve the ionic conductivity of the energy storage device and reduce the internal resistance of the energy storage device. This may improve the overall performance of the energy storage device.

Figure 15:
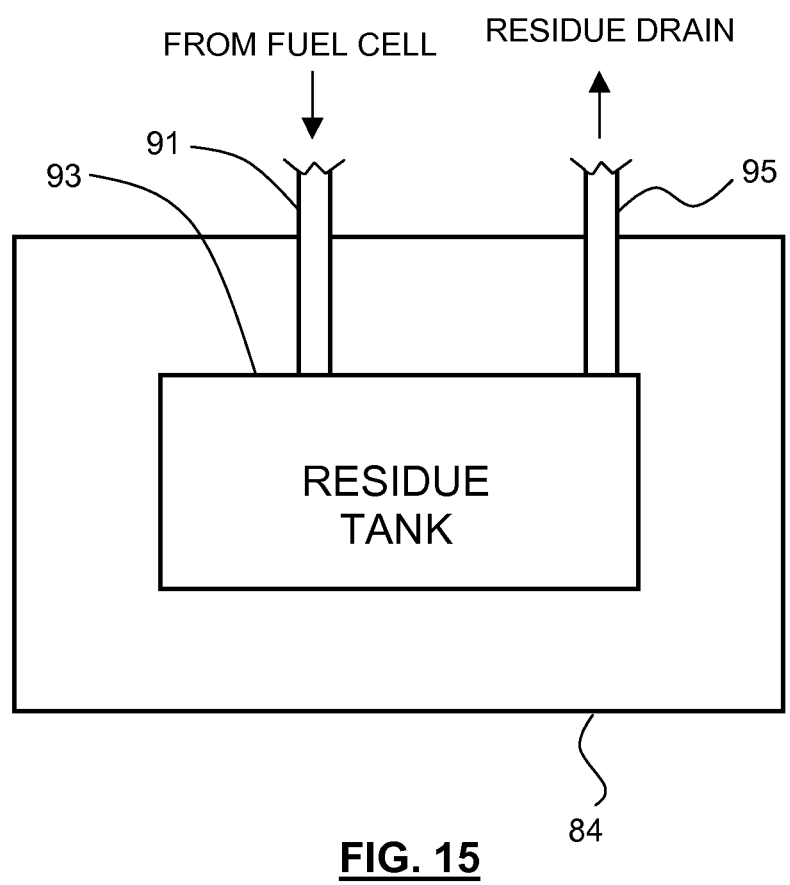
FIG. 15 is a schematic view of an energy storage device, such as a solid-state battery, surrounding a residue tank according to some embodiments.

Turning now to FIG. 15, illustrated therein is an energy storage device 84 surrounding a residue tank 93 according to some embodiments. In this embodiment, a residue conduit 91 is used to transport residue from a fuel cell to the residue tank 93, while a residue drain 95 is used to drain residue from the residue tank 93 (e.g. to empty the residue tank 93).

In this embodiment, heat transfer between the energy storage device 84 and the residue tank 93 may be used to achieve desired operating conditions. For example, excess heat in residue in the residue tank 93 may be transferred to the energy storage device 84. This may be beneficial to increase the operating temperature of the energy storage device 84 (for example, where the energy storage device is a solid-state battery) while decreasing the temperature of residue exiting via the residue tank 93, which may be useful to inhibit a user from being burned by steam, for example, where the residue is water.

In other examples, heat from the energy storage device 84 may be used to increase the temperature of the residue in the residue tank 93. This may be useful, for example, when it is desired that the residue be exhausted as steam.

While in some embodiments illustrated herein the energy storage device is shown as a battery, such as a solid-state battery, the energy storage device could in some cases be a capacitor, a super-capacitor, or another suitable energy storage device.

As shown, some of the energy storage devices, fuel tanks and other components herein have rectangular cross-sectional profiles. However, the energy storage devices, fuel tanks and other components can generally have any suitable shape, including cylindrical shapes, spherical shapes, irregular shapes, etc.

According to one aspect, there is provided a mobile electronic device, comprising a fuel cell configured to receive fuel and generate therefrom electrical power for the mobile electronic device, a fuel tank adapted to store fuel and provide fuel to the fuel cell, and an energy storage device configured to provide power to the mobile device, wherein the fuel tank is sized and shape to at least partially surround the energy storage device.

The fuel tank and the energy storage device may be in thermal contact. The fuel tank and the energy storage device may be at least partially in direct thermal contact.

The fuel tank may surround at least 50% of the exterior surface area of the energy storage device. At least 50% of the exterior surface area of the energy storage device may be in thermal contact with the fuel tank.

The energy storage device may be a battery. The fuel tank may be sized and shaped to removably receive the energy storage device therein.

The mobile electronic device may further comprise a cover for securing the energy storage device to the fuel tank.

The mobile electronic device may further comprising a thermal element provided in the fuel tank for at least one of heating and cooling at least one of the energy storage device and the fuel tank.

At least one of the surface interfaces between the energy storage device and the fuel tank may be sized and shaped to enhance heat transfer therebetween.

The fuel in the fuel tank may have a high heat capacity.

The fuel in the fuel tank may be endothermically activated.

The mobile electronic device may further comprise a frame, wherein the fuel tank is provided as at least part of the frame. The frame may at least partially surround the fuel cell.

According to another aspect, there is provided a mobile electronic device, comprising a fuel cell configured to receive fuel and generate therefrom electrical power for the mobile electronic device, a fuel tank adapted to store fuel and provide fuel to the fuel cell, and an energy storage device configured to provide power to the mobile device, wherein the energy storage device is sized and shape to at least partially surround the fuel tank.

The mobile electronic device may further comprise an insulating element at least partially surrounding the energy storage device. The energy storage device may at least partially surround the fuel cell.

One or more of the embodiments as described herein may provide one or more benefits. Some potential benefits have been briefly described above (such as the potentials to enable hot-swapping, improve performance and increase safety).

Another potential advantage is that fuel cells may be made more practical sources of energy for portable electronic devices in general, and handheld devices in particular. A mobile electronic device poses challenges that may be different for larger-scale (e.g. industrial) devices, or which may not exist at all in larger or non-handheld devices.

At least some of the above embodiments may assist with concerns about weigh and space that may attend smaller electronic devices, by making various components fit into a small space. At least some embodiments may also enable heat management that may be advantageous for a handheld device, which may not be a concern for larger device, such as fuel cells in automobiles and industrial equipment.

A further potential advantage that may be realized by one or more embodiments is that heat, which might conventionally be considered as a waste product, can be put to good use. In particular, the heat generated by use of a battery may be recaptured and used to drive a fuel tank or otherwise facilitate operation of a fuel cell.

Another advantage that may be realized is that the concepts described herein may be adapted to a variety of power systems and a variety of sizes and shapes of mobile electronic devices. The concepts may also be implemented as an alternative to, or in concert with, other heat management techniques that may be employed in a mobile electronic device.

The foregoing aspects of the mobile electronic device, fuel cell, fuel tank, energy storage device and other elements are provided for exemplary purposes only. Those skilled in the art will recognize that various changes in form, material used and design may be made thereto without departing from the spirit and scope of the appended claims.

The invention claimed is:

1. A mobile electronic device, comprising:
   a fuel cell configured to receive fuel and generate therefrom electrical power for the mobile electronic device;
   a fuel tank adapted to store the fuel and provide the fuel to the fuel cell; and
   a solid-state battery configured to provide power to the mobile electronic device, the solid-state battery sized and shaped to at least partially surround at least 50% of an exterior surface of at least one of the fuel tank and the fuel cell and be in thermal contact with at least 50% of the at least one of the fuel tank and the fuel cell so that heat energy from the at least one of the fuel tank and the fuel cell will heat the solid-state battery via conduction.

2. The mobile electronic device of claim 1, wherein the solid-state battery surrounds and is in thermal contact with at least 75% of the at least one of the fuel tank and the fuel cell.

3. The mobile electronic device of claim 1, wherein the solid-state battery surrounds and is in thermal contact with at least 90% of the at least one of the fuel tank and the fuel cell.

4. The mobile electronic device of claim 1, wherein the solid-state battery at least partially surrounds both the fuel tank and the fuel cell.

5. A mobile electronic device, comprising:
   a fuel cell configured to receive fuel and generate therefrom electrical power for the mobile electronic device;
   a fuel tank adapted to store the fuel and provide the fuel to the fuel cell; and
   a solid-state battery configured to provide power to the mobile electronic device, the solid-state battery sized and shaped to at least partially surround at least one of the fuel tank and the fuel cell;
   wherein the solid-state battery surrounds at least 50% of an exterior surface area of the at least one of the fuel cell and fuel tank.

6. The mobile electronic device of claim 5, wherein the fuel cell and the solid-state battery are in thermal contact.

7. The mobile electronic device of claim 6, wherein the fuel cell and the solid-state battery are at least partially in direct thermal contact.

8. The mobile electronic device of claim 6, wherein the fuel cell and the solid-state battery are at least partially in indirect thermal contact.

9. The mobile electronic device of claim 5, wherein at least 50% of the exterior surface area of the at least one of the fuel cell and fuel tank is in thermal contact with the solid-state battery.

10. The mobile electronic device of claim 5, wherein the solid-state battery surrounds and is in thermal contact with at least 75% of the at least one of the fuel tank and the fuel cell.

11. The mobile electronic device of claim 5, wherein the solid-state battery surrounds and is in thermal contact with at least 90% of the at least one of the fuel tank and the fuel cell.

12. The mobile electronic device of claim 5, wherein at least one surface interface between the solid-state battery and the fuel tank is sized and shaped to enhance heat transfer therebetween.

13. The mobile electronic device of claim 5, further comprising an insulating element at least partially surrounding the solid-state battery.

14. A power source for a mobile electronic device, comprising
    a fuel cell configured to receive fuel and generate therefrom electrical power for the mobile electronic device;
    a fuel tank adapted to store the fuel and provide the fuel to the fuel cell; and
    a solid-state battery configured to provide power to the mobile electronic device;
    wherein at least one of the fuel cell, fuel tank and solid-state battery are sized and shaped to at least partially surround another of the fuel cell, the fuel tank and the solid-state battery;
    and wherein the solid-state battery surrounds at least 50% of an exterior surface area of at least one of the fuel cell and fuel tank.

15. The power source of claim 14, wherein the solid-state battery surrounds and is in thermal contact with at least 75% of the exterior surface area of the at least one of the fuel cell and fuel tank.

16. The power source of claim 14, wherein the solid-state battery surrounds and is in thermal contact with at least 90% of the exterior surface area of the at least one of the fuel cell and fuel tank.

* * * * *